No. 630,880. Patented Aug. 15, 1899.
M. GENTRY.
DRAFT EQUALIZER.
(Application filed June 19, 1899.)
(No Model.)
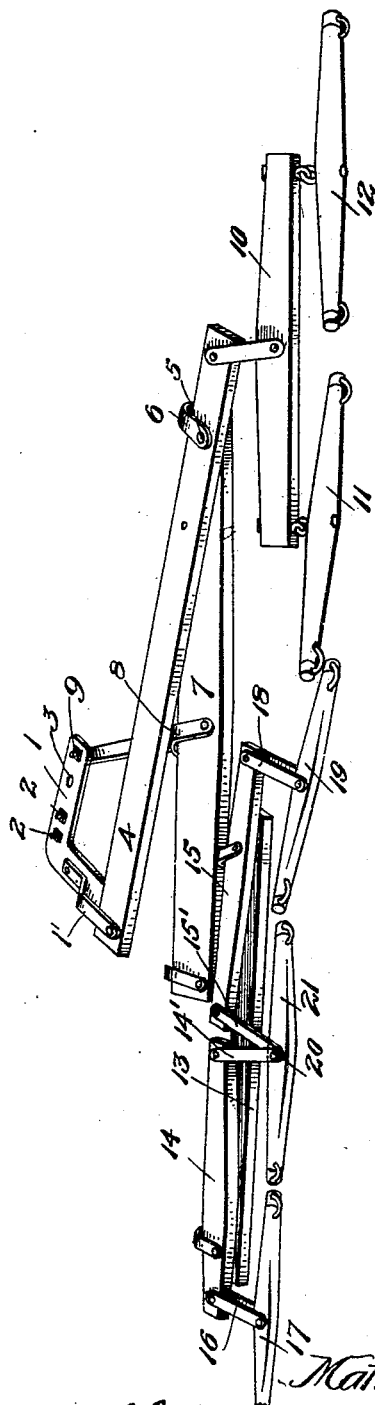

UNITED STATES PATENT OFFICE.

MATTHEW GENTRY, OF ASHKUM, ILLINOIS.

DRAFT-EQUALIZER.

SPECIFICATION forming part of Letters Patent No. 630,880, dated August 15, 1899.

Application filed June 19, 1899. Serial No. 721,176. (No model.)

*To all whom it may concern:*

Be it known that I, MATTHEW GENTRY, a citizen of the United States, residing at Ashkum, in the county of Iroquois and State of Illinois, have invented certain new and useful Improvements in Draft-Equalizers; and I do declare the following to be a full, clear, and exact description of the invention, such as will enable others skilled in the art to which it appertains to make and use the same.

My invention relates to draft-equalizers, and more particularly to that class intended for use with five animals.

The object of the invention is to provide a simple, durable, and effective device of this character.

To this end the invention consists in certain features of construction and combination of parts, which will be hereinafter more fully described and claimed.

The figure in the drawing is a perspective view of a five-horse equalizer embodying my invention.

1 denotes an L-shaped draft-lever, to which a bracket (not shown) is connected by bolts 2 2 and which in turn is connected to the clevis of a gang-plow; but when used on a single-beam plow the bolts 2 2 and bracket are transferred to the holes 3. The longitudinal arm of the angle-lever 1 is provided with a parallel bracket 1', in which is pivoted the inner end of an auxiliary transverse draft-lever 4, which is fulcrumed near its outer end on a bolt 5, secured by means of a clip 6 in the contiguous end of the main transverse draft-lever 7, which is fulcrumed in the forward bifurcated end of a bar 8, the rear end of which is pivoted on the bolt 9 in the outer end of the transverse arm of the angle-lever 1. To the outer end of the auxiliary transverse lever 4 is pivoted the doubletree 10, and to the opposite ends of said doubletree are pivoted the singletrees 11 and 12, to each of which an animal is hitched in the usual manner. A tripletree 13 is pivoted or fulcrumed to the inner end of the main transverse lever 7, and to its outer ends are fulcrumed the doubletrees 14 and 15. The outer end of the doubletree 14 carries a strap 16, in which is fulcrumed the singletree 17, and the outer end of the doubletree 15 carries a similar strap 18, in which is fulcrumed the singletree 19.

The contiguous ends of the doubletrees 14 15 are provided with the counterpart straps 14' 15', which are connected by a common bolt 20, on which is fulcrumed the remaining singletree 21, and from this construction it will be seen that while the combined draft of the five horses is applied directly to the clevis the arrangement of the evener-levers and trees is such that the draft of the three horses on the inner end of the main lever 7 is counterbalanced by the draft of the two horses on the outer end of the auxiliary lever 4, thus insuring an equal distribution of the draft between the entire five animals.

The accompanying drawing shows my invention in the best form now known to me; but many changes in the details might be made within the skill of a good mechanic without departing from the spirit of my invention as set forth in the claim at the end of this specification.

Having thus fully described my invention, what I claim, and desire to secure by Letters Patent, is—

A draft equalizer or evener comprising the angle-lever 1, the main lever 7 and the bar 8 connecting said lever 7 with the outer end of the transverse arm of said angle-lever, the auxiliary lever 4 fulcrumed on the outer end of said main lever 7, and having its inner end pivoted to the free end of the longitudinal arm of said angle-lever, a doubletree and two singletrees fulcrumed on the outer end of said auxiliary lever, a tripletree fulcrumed to the inner end of said auxiliary lever, doubletrees fulcrumed on the opposite ends of said tripletree, singletrees fulcrumed to the outer ends of said doubletrees, straps connecting the contiguous ends of said doubletrees, a bolt connecting said straps, and a singletree fulcrumed on said bolt, the whole constructed and arranged substantially as shown and described.

In testimony whereof I have hereunto set my hand in presence of two subscribing witnesses.

MATT. GENTRY.

Witnesses:
H. J. RUCKRIGEL,
P. H. CALLY.